United States Patent
Gardner

[19]

[11] Patent Number: 6,126,704

[45] Date of Patent: Oct. 3, 2000

[54] METHOD OF FORMING A TERMINAL PIP PROTRUSION ON THE CASING OF AN ALKALINE CELL

[75] Inventor: William H. Gardner, North Easton, Mass.

[73] Assignee: Duracell Inc., Bethel, Conn.

[21] Appl. No.: 09/141,095

[22] Filed: Aug. 27, 1998

[51] Int. Cl.$^7$ .................................................. H01M 6/00
[52] U.S. Cl. ..................... 29/623.1; 429/164; 429/170; 429/163
[58] Field of Search .................................. 429/164, 170, 429/163, 133, 161; 29/623.1

[56] References Cited

U.S. PATENT DOCUMENTS

| | | | |
|---|---|---|---|
| 4,679,316 | 7/1987 | Simonton et al. | 29/731 |
| 4,782,584 | 11/1988 | Mohri et al. | 29/623.1 |
| 4,957,827 | 9/1990 | Kordesch et al. | 429/60 |
| 5,069,988 | 12/1991 | Tomantschger et al. | 429/59 |
| 5,346,783 | 9/1994 | Tomantschger et al. | 429/66 |
| 5,462,819 | 10/1995 | Jacus et al. | 429/174 |
| 5,506,068 | 4/1996 | Dan et al. | 429/50 |

*Primary Examiner*—Maria Nuzzolillo
*Assistant Examiner*—Raymond Alejandro
*Attorney, Agent, or Firm*—Barry D. Josephs; Paul I. Douglas; Thomas G. Krivulka

[57] ABSTRACT

The invention is directed to a method of forming a pip protrusion at the closed end of a cylindrical casing of an electrochemical cell. The cell is preferably an alkaline cell having an anode comprising zinc, a cathode comprising manganese dioxide, and an alkaline electrolyte. The method of the invention is directed to forming the pip protrusion at the closed end of the casing so that the pip protrusion becomes an integral part of the casing. In an alkaline cell the pip protrusion becomes the cell's positive terminal. The method of the invention involves inserting cathode material into the casing through the open end thereof and then forcing an elongated plunger having a diameter less than the inside diameter of casing into the cathode material while providing means for preventing the cathode material form rising more than a predetermined level with the casing. The force of the plunger causes the cathode material to become compacted while simultaneously causing a pip protrusion to form at the closed end of the casing.

24 Claims, 4 Drawing Sheets

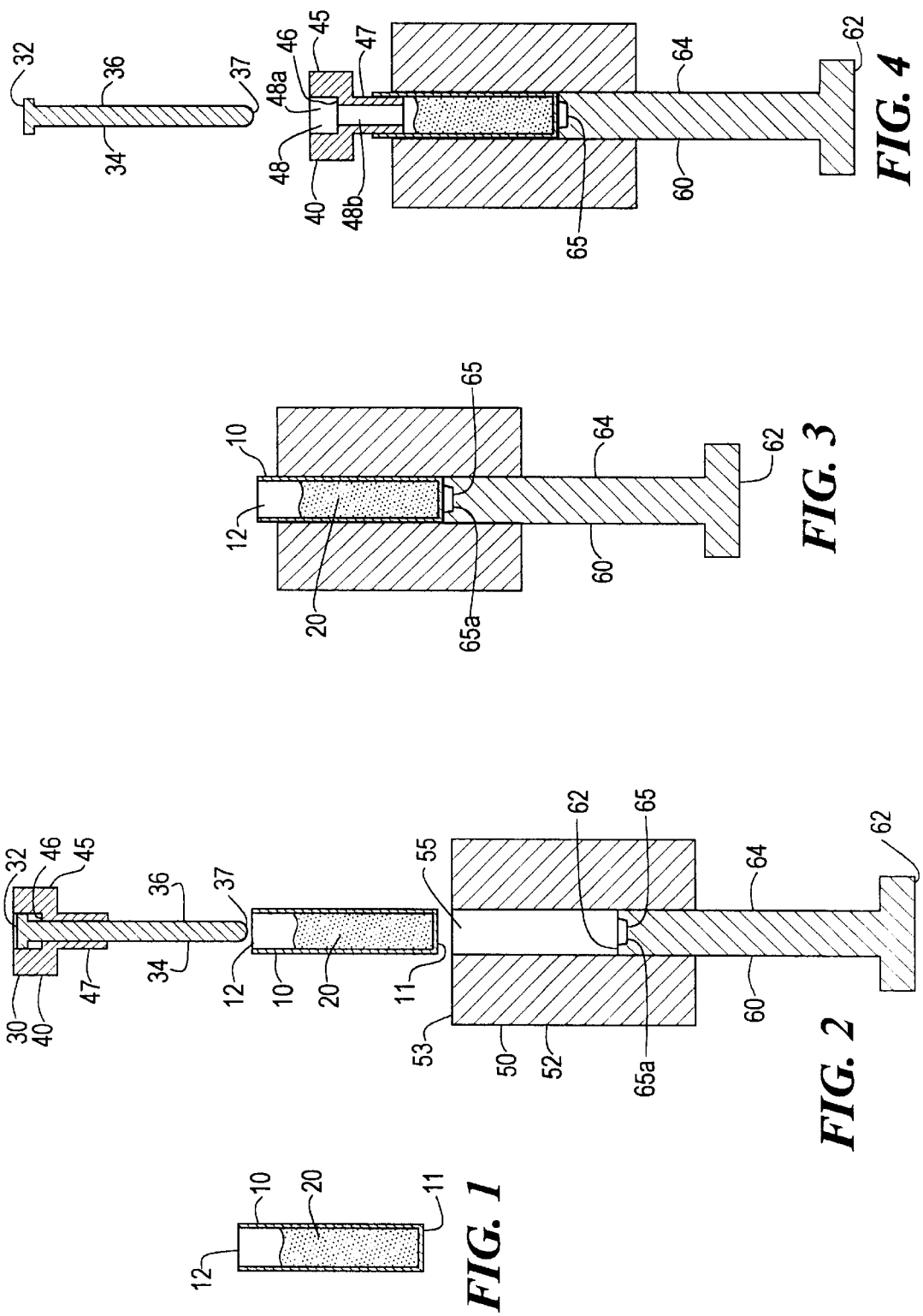

1

METHOD OF FORMING A TERMINAL PIP PROTRUSION ON THE CASING OF AN ALKALINE CELL

FIELD OF THE INVENTION

The invention relates to a method of forming a terminal pip protrusion on the cylindrical casing of an electrochemical cell, particularly an alkaline cell having an anode comprising zinc and cathode comprising manganese dioxide. The invention relates to loading the cell with cathode active material while simultaneously forming a terminal pip protrusion on the cell casing.

BACKGROUND

Conventional alkaline cells are typically formed of a cylindrical steel casing having a closed end and open end. The alkaline cell may typically have an anode comprising zinc and a cathode comprising manganese dioxide. The cathode active material typically comprises a mixture of particulate $MnO_2$, graphite and KOH electrolyte solution. The anode typically comprises particulate zinc KOH electrolyte and gelling agent. The cathode material is typically in contact with the inside surface of the cell casing and the anode material is placed within the core of the casing. An ion porous separator material, typically of rayon or cellulosic material is placed between the cathode and anode. There is typically a metal pip protrusion at the end of the cell casing in electrical contact with the cell casing and cathode. The pip protrusion typically forms the cell's positive terminal. After the cell is loaded with anode, cathode, separator, and electrolyte, the open end of the casing is sealed with an end cap assembly which may include an insulating member, metal end cap and elongated current collector. The end cap is in electrical contact with the anode material through the current collector and typically forms the cell's negative terminal.

The pip protrusion (positive terminal) in electrical contact with the cell casing is typically formed by a separate plate having a pip protrusion emanating therefrom. Such plate is welded to the flat bottom of the casing, that is at the casing's closed end. The welding of the plate to the cell casing causes the pip protrusion to be in electrical contact with the casing and form the cell's positive terminal. The method of forming the positive pip protrusion by welding a separate plate to the flat bottom of the cell's casing has the disadvantage that it requires a separate processing step and also additional material.

Alternatively, the pip protrusion may be formed during the deep drawing process used in fabricating the cell casing. Cylindrical cell casings for alkaline cells are conventionally fabricated by the deep drawing method wherein the diameter of the casing is progressively reduced in a series of steps employing punches each having a smaller diameter than the one preceding. The pip protrusion may be formed during the latter stages of this process but at the expense of additional tooling required to form the pip protrusion mold on at least several punches, each of progressively smaller diameter. Such punches wear out frequently and have to be replaced. Additionally, the pip protrusion formed on the casing may subsequently be damaged during transport and handling. The process of compacting cathode material into the can having a preformed pip protrusion may also cause distortion of the pip. Alternatively, the pip protrusion may be formed in a separate step after a flat bottom cylindrical casing has been formed. Thus, a plunger or mandrel may be pushed into the casing interior causing the casing closed end (flat bottom) to be pushed out at its center to form the desired pip protrusion before the casing is loaded with active materials. The method of forming a pip protrusion in this manner, has the disadvantage that it requires a separate processing step, additional equipment and the added expense and assembly time associated with such processing.

It is thus desirable to form the positive pip protrusion for an alkaline cell in a manner that will eliminate the need for additional materials and separate processing steps so that the overall cell assembly time may be reduced.

SUMMARY OF THE INVENTION

The invention is directed to a method of forming a pip protrusion at the closed end of a cylindrical casing of an electrochemical cell. The casing is preferably initially in the form of a cylindrical configuration having an open end and a closed end. The cell is preferably an alkaline cell having an anode comprising zinc, a cathode comprising manganese dioxide, and an alkaline electrolyte. The method of the invention is directed to forming the pip protrusion so that the pip protrusion becomes an integral part of the casing avoiding the need to weld or adhere any conductive plates to the closed end of the cell casing. In an alkaline cell the pip protrusion becomes the cell's positive terminal.

In one aspect the method involves the step of first inserting cathode material into the casing through the open end thereof and then compacting the cathode material while it is in the casing. The pip protrusion is formed simultaneously while the cathode material is being compacted within the casing. Initially the closed end of the casing may be flat or partially pipped. That is, the casing may initially be flat or have a pip protrusion which may be of smaller diameter and/or smaller height than the final pip protrusion.

The method of the invention may be carried out by first loading the cell casing with cathode material and placing the casing into a channel within a fixed holding member (anvil nest). The holding member is preferably oriented so that the casing is in vertical position within said channel with the casing oriented so that its open end is on top. Alternatively, the holding member may be oriented so that the casing is in horizontal position or in up side down position, that is, with the open end at the bottom. The casing is held within said channel by an anvil having an elongated body inserted into the bottom of the channel. The tip end of the anvil presses against the closed end of the casing. The surface of the anvil (tip end) pressing against the closed end of the cell casing has a depression in its surface conforming to the shape and size of the desired pip protrusion. An elongated plunger is inserted into the cathode material while the cell is held in vertical position with the open end on top. The plunger has a diameter less than the inside diameter of the cell casing. The plunger is inserted with force while means is applied to keep the cathode material from rising beyond a predetermined level along the length of the cell casing. The cathode material may be prevented from rising beyond a desired level within the casing by inserting a housing into the open end of the casing and maintaining the housing in fixed position. The housing may have a cavity theretrough. The plunger may be inserted into the cathode material through the cavity in said housing.

As the plunger is pushed into cathode material, the cathode material is forced up into an annular region within the cell casing, which is the region between the plunger surface and the inside surface of the casing. The housing inserted at the open end of the casing prevents the cathode material from rising beyond a desired distance along the length of the cell or escaping from the casing. As the plunger is pushed into the cathode material, the material compacts into said annular region simultaneously causing the flat (or partially pipped) bottom of the casing to be forced into the depression in the end surface of anvil. This results in a fully formed pip protrusion at the closed end of the casing. Surprisingly, no portion of the plunger need ever contact any portion of the anvil surface or any portion of the depression in the anvil surface in order for the pip protrusion to be formed in the casing.

After the cathode material has been compacted and the pip protrusion formed at the closed end of the casing the plunger is removed and casing may be removed from the holding member. A separator sheet may then be inserted to cover the exposed surface of the compacted cathode material. Anode material may be injected into the central region of the casing. An end cap assembly which includes a plastic insulated disk and a terminal end cap over the insulating disk may be inserted into the open end of the cell. The peripheral edge of the cell casing may then be crimped around the peripheral edge of the end cap assembly to completely seal the open end of the casing. In an alkaline cell the terminal end cap forms the cell's negative terminal and the insulating disk insulates the terminal end cap from the cell casing.

BRIEF DESCRIPTION OF THE DRAWINGS

FIG. 1 a schematic cross section of a cell casing with cathode material therein.

FIG. 2 is a cross section exploded view showing cell casing, plunger assembly, anvil and anvil nest.

FIG. 3 is a cross section exploded view showing the cell casing placed within the anvil nest.

FIG. 4 is a cross section exploded view showing the plunger assembly housing in contact with the casing.

DETAILED DESCRIPTION

The method of the invention, by way of specific example, may be applied to forming a positive pip protrusion at the closed end of the cylindrical casing of an electrochemical cell. The cell to which the method of the invention has particularly utility is an alkaline cell having a cylindrical casing initially formed with a closed end and an open end and having an anode comprising zinc, a cathode comprising manganese dioxide, and an alkaline electrolyte. The method of the invention is not intended to be restricted to application to any particular cell size.

Figure 14:
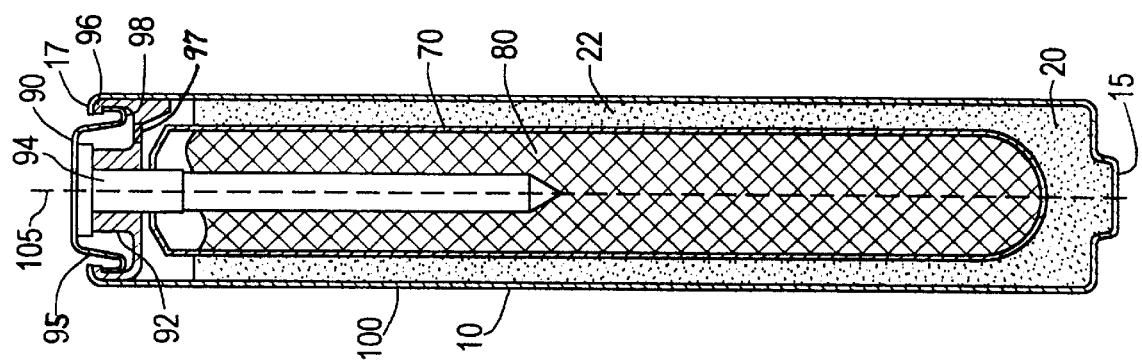
FIG. 14 is a cross section view of the cell after the cell contents have been loaded and the end cap assembly has been inserted to seal casing's open end.

The method of the invention, by way of specific example, may be applied to compacting the cathode material of an AAAA (Quad A) alkaline cell 100 and simultaneously forming a positive pip protrusion at the closed end of the cylindrical casing 10 for such cell. (The AAAA cell is cross referenced by American National Standards Institute (ANSI) as "25A" cell and in Europe by the International Electro-technical Commission (IEC) designation "LR61" cell.) The AAAA (LR61) alkaline cell 100 (FIG. 14) is a cylindrical cell comprising a cylindrical casing 10 of length of between about 41.5 and 42.5 millimeters and outside diameter of between about 7.7 and 8.3 millimeters and has a central longitudinal axis 105. The casing 10 wall thickness may be between about 0.1 mm and 0.25 mm. The AAAA (LR61) cell 100 may employ alkaline cell anode, cathode, and electrolyte chemistries and separator material conventionally employed in larger cells, for example, AA or C and D cells. Thus, cell 100 may have an anode 80 comprising zinc, a cathode 20 comprising compacted manganese dioxide, and an electrolyte within the anode comprising potassium hydroxide. Additives may be employed, as conventional, to modify the cell chemistry. The alkaline cell may employ a conventional alkaline cell ion porous separator material 70, typically comprising rayon or cellulose. The end cap assembly 10 of the invention is not intended to be restricted to any particular alkaline cell chemistry and/or alkaline cell size. Such representative chemistries, for example, are disclosed in U.S. Pat. No. 5,401,590 herein incorporated by reference. The method of the invention while illustrated with respect to a AAAA (Quad A) alkaline cell is not intended to be restricted to cell size and may be equally applicable to forming the positive pip protrusion (pip protrusion at the closed end of the casing) of AAA, AA, C, and D size alkaline cells.

In a specific embodiment the method of the invention may be applied by first providing an empty cylindrical casing 10, preferably formed of nickel plated steel, having a closed end 11 and an open end 12. The closed end 11 may initially be flat as shown in FIG. 1. Casing 10 is filled with a mixture of cathode material 20 by pouring or injecting the cathode material into the open end 12 of the casing so that it is filled to a predesignated level (FIG. 1). The cathode material 20 may have the following composition: Electrolytic manganese dioxide (80–86 wt %), graphite (7–10 wt %), and a 6 to 11 Normal "aqueous KOH electrolyte solution" (5 to 15 wt %). The aqueous KOH electrolyte solution may desirably contain between about 1 and 5 wt % ZnO. A preferred cathode mixture may contain about 82 wt. % electrolytic manganese dioxide (EMD), 8 wt % graphite and about 10 wt. % of a 7 Normal KOH electrolyte solution containing between about 1 and 5 wt % ZnO.

Figure 6:
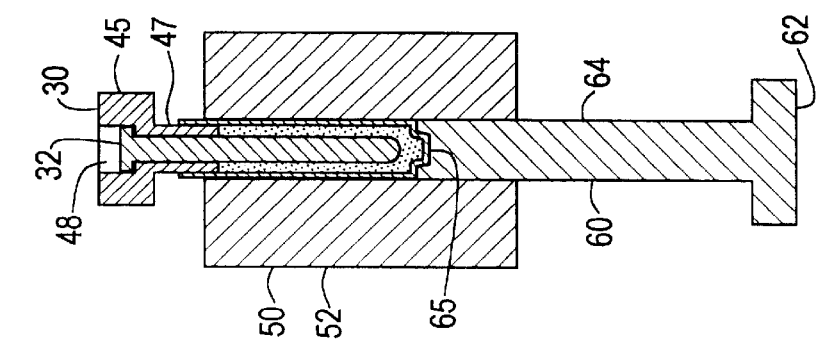
FIG. 6 is a cross section view showing the formation of the positive pip protrusion during compression of the cathode material.

An anvil 60 and an anvil receiving member (anvil nest 52) is provided. Anvil nest 52 has a side surface 50 and top surface 53. Anvil 60 has an elongated body 64. Anvil nest 52 may be fixed to a larger object so that it is immobile. It functions as a holding member for casing 10. Anvil nest 52 has a cylindrical channel 55 running therethrough (FIG. 2). The diameter of channel 55 is slightly larger than the outside diameter of casing 10 and is also slightly larger than the diameter of elongated body 64 of anvil 60. An anvil 60 is pushed up a short distance from the bottom of channel 55 (FIG. 2). Casing 10 filled with cathode material 20 may then be inserted into the top of central channel 55 until it comes to rest against end 62 of the anvil (FIG. 3). The center of end 62 has a depression 65 in its surface of size and shape corresponding to the size and shape of the pip protrusion desired on the closed end 11 of casing 10. Depression 65 preferably lies adjacent the center of closed end 11 of casing 10. The apex 65a of depression 65 points away from the closed end 11 as shown in FIG. 3. Depression 65 may typically be of semispherical shape, truncated cylindrical shape, truncated parallelepiped, or truncated prismatic shape. A plunger assembly 30 is provided. Plunger assembly 30 may comprise a housing 40 and an elongated member (plunger 34) which is inserted through a cavity 48 running through the length of housing 40. Plunger 34 may be in the configuration of a nail having a cylindrical elongated body 36 and head 32 of diameter larger than the diameter of body 36. The body 36 may be in the configuration of a cylinder, cone (including truncated cone), or polyhedron. For example, body 36 may be in the form of a parallelepiped, tetrahedron, or prism. Body 36 is not intended to be limited to any particular shape as other geometric configurations could also be employed. The elongated body 36 has a maximum diameter which is less than the inside diameter of casing 10. Elongated body 36 has a diameter approximately equal to the smallest diameter of cavity 48. Housing 40 may have an upper portion 45 and an integral lower portion 47. The upper portion 45 may be of larger diameter than the lower portion. There may be a cavity 48 running through the length of housing 40. The cavity 48 may comprise an upper cavity portion 48a of larger diameter than the lower cavity portion 48b. The bottom surface of cavity 48a provides a seat 46 for head 32 so that plunger 34 may be inserted through cavity 48 until head 32 comes to rest against seat 46 (FIG. 6).

Figure 5:
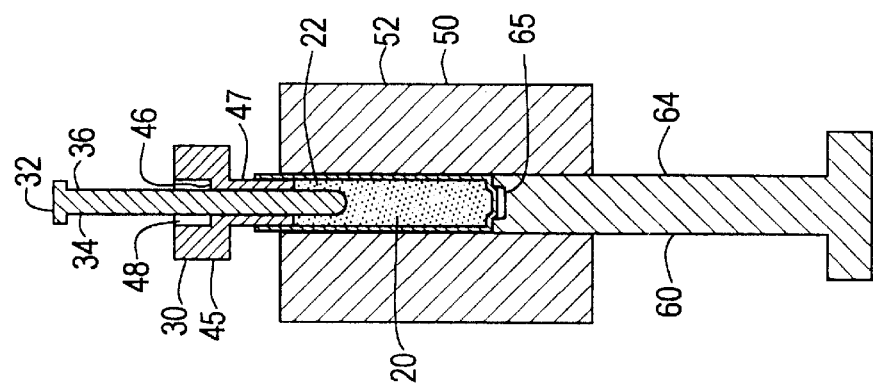
FIG. 5 is a cross section view showing the plunger being inserted into the cell casing and compressing the cathode material.

Initially housing 40 and plunger 34 are separated from each other (FIG. 4). The housing 40 may be placed against the open end 12 of casing 10 while an upward force is exerted on anvil 60 to hold casing 10 wedged in between housing 40 and anvil 60. The housing 40 may be inserted so that its lower portion 47 penetrates a predetermined distance into said open end 12 of casing 10. A downward force may be applied to the housing to keep it in fixed position. While the housing 40, anvil nest 52, and anvil 60 are held in fixed position, plunger 34 may then be inserted through cavity 48 (FIG. 5) and into cathode material 20. Plunger 34 may be pushed through cavity 48 typically with a force of between about 1000 and 2000 pounds (4440 and 8900 Newtons). As plunger 34 is pushed into cathode material 20, the cathode material becomes compacted and is forced up into annular region 22 which is the region within casing 10 between the plunger body 36 surface and the inside longitudinal surface of casing 10. The cathode material is forced up along annular region 22 until it reaches lower portion 47 of housing 40. At least the majority amount of said cathode material within said casing becomes compacted within said annular region 22. The lower portion 47 of housing 40 is held inserted within casing 10 a predetermined fixed distance from the open end 12. Portion 47 of housing 40 prevents the cathode material from moving any further up along the length of the casing as plunger 34 continues to penetrate further into the cathode material 20. This results in greater compaction of cathode material 20 as plunger 34 is forced further into the cathode material. The diameter of plunger body 36 is selected so that the portion of plunger 34 inserted into the cathode material 20 has a volume approximately equal to the desired volume by which cathode material 20 is intended to be displaced, that is, the intended volume of cathode compaction.

As the plunger 34 compacts the cathode material 20 and forces the compacted cathode material into annulus 22, the exerted pressure on the cathode material 20 causes flat bottom 11 of the casing to be forced into depression 65 within the end surface 62 of anvil 60. The body portion 36 of plunger 34 is pushed into cathode material 20 until the head 32 comes to rest against seat 46 at the bottom of upper cavity 48a (FIG. 6). Thus, by the time plunger 34 has been inserted its maximum distance through the cathode cavity a pip protrusion 15 has been formed on the closed end 11 of casing 10. Surprisingly, the tip 37 of plunger 34 need never contact end 62 of anvil 60 and need never contact depression 65 in order for the pip protrusion 15 to be formed. As may be seen from the preferred embodiment (FIG. 6) there is a measurable distance, desirably between about 0.25 and 1.80 mm between the tip 37 of plunger 34 and depression 65.

Closed end 11 of casing 10 instead of initially having a flat bottom, may be partially pipped. That is, casing 10 (FIG. 1) may initially have a pip protrusion which may be of smaller diameter and/or smaller height than the final pip protrusion 15 resulting from insertion of plunger 34 into the cathode material 20. The partial pip protrusion at the closed end 11 of casing 10 may be formed during fabrication of the casing, for example, by the method of deep drawing. Preforming the closed end of the casing with a fully or partially formed pip during fabrication of the casing has the disadvantage that additional processing and too ling is required.

If the casing 10 of nickel plated steel is intended for a AAAA (QUAD A) cell it may have a thickness of about 0.20 mm. In a preferred embodiment for application to the casing of a AAAA (Quad A) cell, the body 36 of plunger 34 may have a diameter of about 5.0 mm and the insertion length of the plunger into cathode material 20 may be about 34 mm. Plunger 34 may thereby displace about 0.67 cubic centimeters of cathode material. At an applied plunger pressure of between about 1000 and 2000 pounds force the desired pip 15 formed may have an outside diameter of about formed may 3.05 mm, an inside diameter of about 2.65 mm and a height of about 1.3 mm if the closed end 11 of casing 10 is flat as shown in FIG. 1 or partially pipped. Surprisingly, this may be achieved even though the tip 37 of plunger 34 does not come closer than about 1.0 mm from the closed end 11 of the casing.

Figure 7:
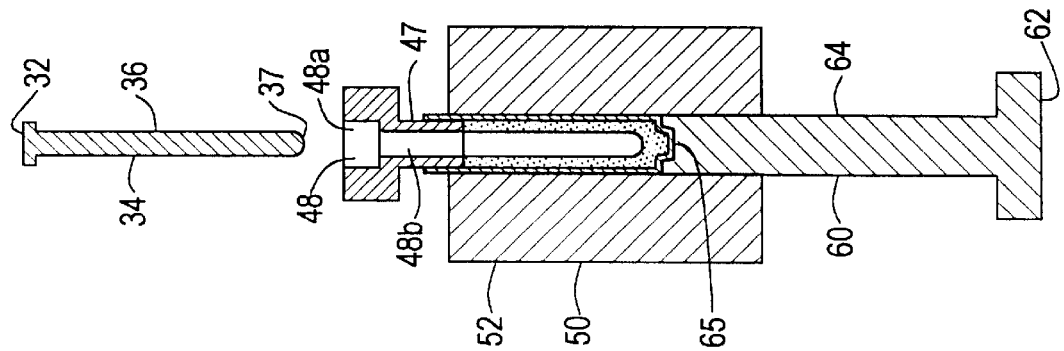
FIG. 7 is a cross section view showing the plunger removed from the cell casing after the cathode material has been compressed and the pip protrusion formed on the casing.
Figure 10:
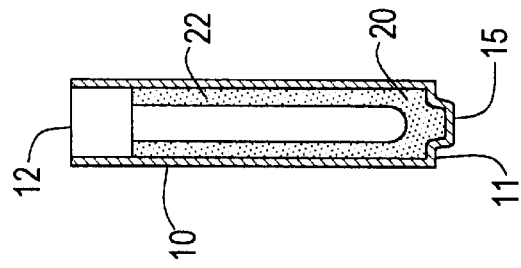
FIG. 10 is a cross section view showing the cell casing removed from the anvil nest.
Figure 9:
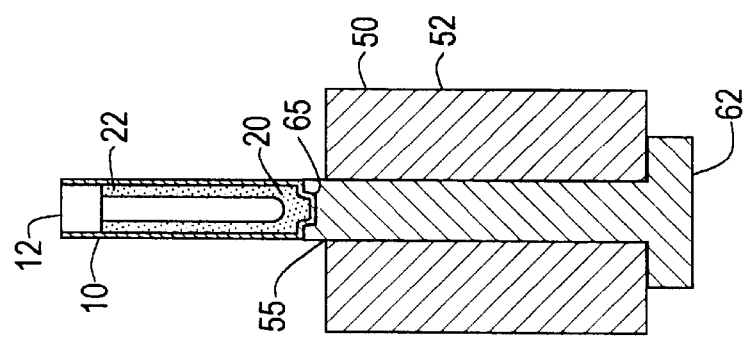
FIG. 9 is a cross section view showing the anvil pushing the cell casing out of the anvil nest.
Figure 8:
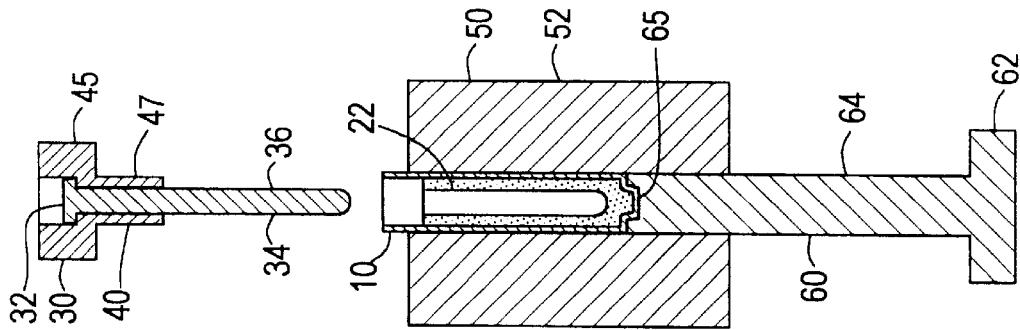
FIG. 8 is a cross section view showing the plunger assembly housing removed from the cell casing.
Figure 13:
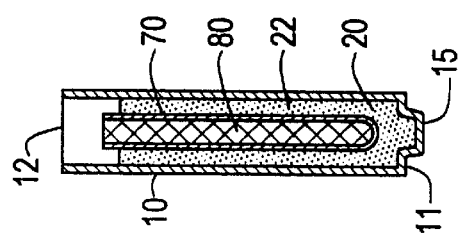
FIG. 13 is a cross section view showing the cell casing loaded with cathode, separator and anode material.
Figure 12:
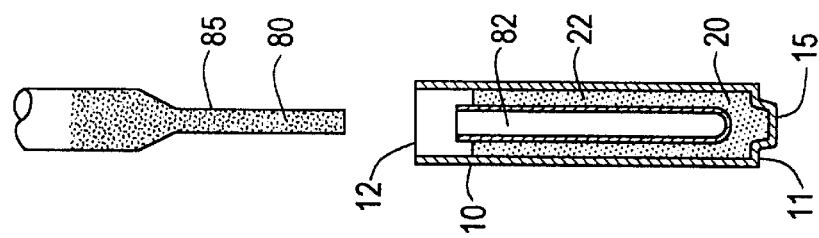
FIG. 12 is a cross section exploded schematic showing the anode material ready for injection into the anode cavity.
Figure 11:
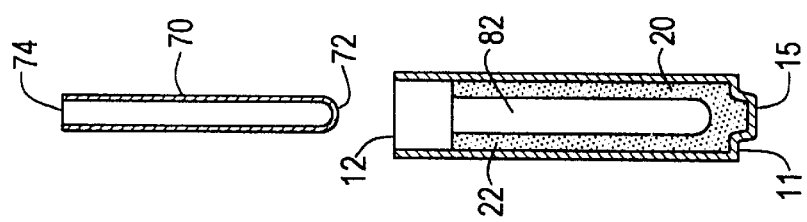
FIG. 11 is a cross section exploded view showing the separator ready for insertion into the cell's anode cavity.

Plunger assembly 30 may be disassembled by removing plunger 34 from housing 40 and then removing housing 40 from contact with the anvil nest 52 (FIG. 7). The plunger 34 may be removed from the housing by simply sliding it up through cavity 48. Alternatively, the plunger assembly 30, as a whole, may be removed from the contact with anvil nest 52 (FIG. 8). Anvil 60 may then be pushed upwards forcing casing 10 out of the anvil nest 52 (FIG. 9). Casing 10 has the positive pip 15 formed at the casing's closed end 11 as shown in FIG. 10. A separator 70 in the configuration of a tube having a closed end 72 and an open end 74 is inserted into the central cavity 82 of casing 10. Separator 70 may be composed of ion porous separator material conventionally employed in alkaline cells, for example, of cellulosic or rayon material. Anode material 80 which may be in the form of a wet slurry may then be injected into central cavity (anode cavity) 82 by employing a slurry pump having an outlet nozzle 85. The anode material 80 may be in the form of a gelled mixture containing mercury free (zero-added mercury) zinc alloy powder. Such mixture may typically contain aqueous KOH electrolyte solution, gelling agent, e.g. acrylic acid copolymer such as CARBOPOL C940 from B.F. Goodrich; polyethoxy ester surfactant or anode mixtures in compositions as described in U.S. Pat. No. 5,401,590 herein incorporated by reference. The anode cavity 82 is filled with anode material to the desired level (FIG. 13). Alternatively, anode material may be manually injected into anode cavity 82 by application of a squeezable tube or syringe. Additional alkaline electrolyte comprising an aqueous solution of KOH (7 to 11 Normal) containing about 1 to 5 wt. percent ZnO may be added to the anode and cathode material within casing 10 (FIG. 13).

An end cap assembly 90 comprising a plastic insulating disk 92, end cap 95 with metal current collector 94 welded thereto is inserted into the open end 12 of casing 10. End cap 95 may have one or more vent holes 98 in its surface and plastic insulating disk 92 may comprise an integrally disposed thin region 97 which functions as a rupturable membrane which is designed to rupture if gas build up within the cell reaches a predetermined value. The peripheral edge 17 of casing 10 may be crimped over the peripheral edge 96 of insulating disk 92 and the peripheral edge 98 of end cap 95 by applying methods described in U.S. Pat. No. 5,150,602 herein incorporated by reference. Plastic insulating disk 92 may of polypropylene, talc filled polypropylene, sulfonated polyethylene or nylon. Current collector 94 may be selected from a variety of known electrically conductive metals found to be useful as current collector materials, for example, brass, tin plated brass, bronze, copper or indium plated brass. End cap 95 may be constructed of a conductive metal having good mechanical strength and corrosion resistance such as nickel plated cold rolled steel or stainless steel, preferably, nickel plated low carbon steel.

Although the present invention has been described with respect to a specific embodiment, it should be appreciated that variations are possible within the concept of the invention. Accordingly, the invention is not intended to be limited to the specific embodiment described herein but rather its scope is reflected by the claims and equivalents thereof.

What is claimed is:

1. A method for forming a terminal pip protrusion on a cylindrical casing for an alkaline electrochemical cell having a cathode comprising manganese dioxide, comprising the steps of:

providing a cylindrical casing having cathode material contained therein and pushing a portion of an elongated member against said cathode material, said casing operatively contacting an adjacent surface having a depression formed therein, whereby as said elongated member pushes against said cathode material, the cathode material becomes compacted and simultaneously therewith a portion of the outside surface of said casing is pushed into said depression forming a pip protrusion on said casing.

2. A method for forming a terminal pip protrusion at the closed end of a cylindrical casing for an alkaline electrochemical cell having a cathode comprising manganese dioxide, comprising the steps of:

a) providing a cylindrical casing having a closed end and a cathode material contained within said casing;

b) applying a surface having a depression therein against a portion of the outside surface of the closed end of said casing;

c) pushing an elongated member into said cathode material so that it penetrates through at least a portion of said cathode material;

whereby as said elongated member is pushed into said cathode material, the cathode material becomes compacted and simultaneously therewith a portion of said outside surface of said casing is pushed into said depression forming a pip protrusion at the closed end of said casing.

3. The method of claim 2 further comprising the step of:

d) applying means for preventing cathode material from moving beyond a predetermined level along the length of said casing as said elongated member is pushed into said cathode material.

4. The method of claim 2 wherein the depression is aligned with about the center of the closed end of the casing and the elongated member has a maximum diameter less than the inside diameter of said casing.

5. The method of claim 2 wherein the closed end of the casing in step a is flat or has a pip protrusion of smaller size than the pip protrusion formed in step c.

6. The method of claim 3 wherein the means for preventing the cathode material from moving beyond a predetermined level along the length of said casing comprises a housing placed at the open end of said casing and a portion of said housing penetrates into said casing a predetermined distance along the length of said casing.

7. The method of claim 6 wherein said housing has a cavity therethrough and said elongated member is inserted into the cathode material through said cavity.

8. The method of claim 7 wherein the housing has an upper portion and a lower portion wherein the width of the lower portion is less than the width of the upper portion and wherein said cavity runs through both the upper and lower portions of said housing and wherein the housing is placed at the open end of casing with the lower portion closer to the cathode material than the upper portion.

9. The method of claim 8 wherein the housing is inserted into the open end of said casing so that the lower portion of the housing penetrates into the casing a predetermined distance from the open end of the casing.

10. The method of claim 9 wherein a portion of the cavity through the upper portion of the housing has a diameter greater than the diameter of the cavity through the lower portion of said housing.

11. The method of claim 10 wherein the upper portion of the housing is provided with a seat within the cavity therethrough and said elongated member has an end portion having a diameter greater than the diameter of the body of said elongated member, wherein force is applied to the elongated member to push it into said cathode material until said seat engages said end portion to prevent said elongated member from penetrating further into said cathode material.

12. The method of claim 11 wherein the elongated member in the configuration of a nail.

13. The method of claim 7 wherein the elongated member is inserted into said cathode material without contacting any portion of said surface having a depression therein.

14. The method of claim 2 comprising the step of inserting the casing into a channel within the a holding member prior to inserting said elongated member into the cathode material.

15. The method of claim 14 wherein the surface having said depression is located at the end of an anvil.

16. The method of claim 15 comprising the step of inserting said anvil into said channel within the holding member so that said depression is adjacent the closed end of said casing.

17. The method of claim 3 wherein at least a major amount of the cathode material becomes compacted within an annular region within the casing, said annular region being between the inside longitudinal surface of the casing and the surface of the portion of the elongated member penetrating into the cathode material.

18. The method of claim 17 further comprising the step of removing the elongated member from the casing after the cathode material has been compacted and the pip protrusion at the closed end of said casing formed; inserting a separator material into the casing so that it contacts the exposed surface of said compacted cathode material; and inserting anode material into the central region of the casing to fill the space occupied by said elongated member.

19. The method of claim 18 further comprising the step of inserting an end cap assembly into the open end of the casing after the step of inserting said anode material and crimping the peripheral edge of the casing over the peripheral edge of the end cap assembly to form a sealed cell, said end cap assembly comprising an insulating disk, a terminal end cap over the insulating disk and an elongated current collector in electrical contact with the terminal end cap.

20. The method of claim 2 wherein the casing is of size corresponding to the casing size for an AAAA cell.

21. The method of claim 20 wherein the elongated member is inserted into the cathode material with a force of between 1000 and 2000 pounds.

22. The method of claim 20 wherein the casing has a thickness of between about 0.1 and 0.25 mm, and the formed pip protrusion has a height of about 1.3 mm and an inside diameter of between about 2.6 mm.

23. The method of claim 2 wherein the portion of said elongated member penetrating said cathode material has a configuration selected from the group consisting of cylinder, cone, truncated cone, and polyhedron.

24. The method of claim 2 wherein the portion of said elongated member penetrating said cathode material has a cylindrical configuration.

* * * * *